(12) United States Patent
Ruth et al.

(10) Patent No.: US 12,705,569 B2
(45) **Date of Patent: *Aug. 11, 2026**

(54) SYSTEMS AND METHODS OF PACKAGE CONTAINER RETURN

(71) Applicant: Motogo, LLC, Austin, TX (US)

(72) Inventors: David Brian Ruth, Austin, TX (US); Yuan-Chang Lo, Snoqualmie, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/034,227

(22) Filed: Jan. 22, 2025

(65) Prior Publication Data

US 2025/0165915 A1 May 22, 2025

Related U.S. Application Data

(60) Continuation of application No. 18/472,413, filed on Sep. 22, 2023, now Pat. No. 12,211,000, which is a division of application No. 17/336,892, filed on Jun. 2, 2021, now Pat. No. 11,797,916, which is a (Continued)

(51) Int. Cl.

| | |
|---|---|
| ***G06Q 10/0837*** | (2023.01) |
| ***B65D 55/02*** | (2006.01) |
| ***G06Q 10/087*** | (2023.01) |
| ***G06Q 50/40*** | (2024.01) |
| ***G07C 9/00*** | (2020.01) |

(Continued)

(52) U.S. Cl.

CPC ....... *G06Q 10/0837* (2013.01); *G06Q 10/087* (2013.01); *G06Q 50/40* (2024.01); *B65D 43/16* (2013.01); *B65D 55/02* (2013.01); *G06F 9/542* (2013.01); *G07C 9/00* (2013.01)

(58) Field of Classification Search

CPC .. G06Q 10/0837; G06Q 10/087; G06Q 50/40; B65D 43/16; B65D 55/02; G06F 9/542; G07C 9/00

USPC .......................................................... 705/340

See application file for complete search history.

(56) References Cited

U.S. PATENT DOCUMENTS

| | | | |
|---|---|---|---|
| 5,406,823 | A | 4/1995 | Yong et al. |
| 5,960,411 | A | 9/1999 | Hartman et al. |

(Continued)

OTHER PUBLICATIONS

"Re-Turnz" website <http://re-turnz.com/> (<http://web.archive.org/web/20190531023144/http://re-turnz.com/> captured using Wayback on May 31, 2019) (Year: 2019).*

(Continued)

*Primary Examiner* — Michael P Harrington
*Assistant Examiner* — Brian A Tallman
(74) *Attorney, Agent, or Firm* — Moore Intellectual Property Law, PLLC

(57) ABSTRACT

A delivery management server includes one or more processors configured to receive a return request notification indicating that a return is requested using a package container. The one or more processors are also configured to, based at least in part on receipt of the return request notification and a determination that a cover of the package container is in a closed state: store a trial end time, determine a trial duration based on a comparison of a trial start time and the trial end time, and based on a determination that the trial duration is less than or equal to a trial duration threshold, send a request to direct a transportation vehicle to a container location to retrieve the package container.

20 Claims, 6 Drawing Sheets

Related U.S. Application Data continuation of application No. 16/433,471, filed on Jun. 6, 2019, now Pat. No. 11,055,656.

(51) Int. Cl.
*B65D 43/16* (2006.01)
*G06F 9/54* (2006.01)

(56) References Cited

U.S. PATENT DOCUMENTS

| | | | | |
|---|---|---|---|---|
| 8,311,895 | B1 * | 11/2012 | Murugan | G06Q 10/08 705/26.1 |
| 9,697,548 | B1 | 7/2017 | Jaff et al. | |
| 9,842,449 | B1 | 12/2017 | Ruth | |
| 10,657,486 | B1 | 5/2020 | Wolter et al. | |
| 2005/0285715 | A1 * | 12/2005 | Comunale | E05B 73/00 340/5.1 |
| 2010/0057594 | A1 * | 3/2010 | Syme | G06Q 10/08 705/29 |
| 2010/0201519 | A1 | 8/2010 | Dagher et al. | |
| 2011/0320376 | A1 * | 12/2011 | Dearlove | G06Q 10/08 705/337 |
| 2016/0335595 | A1 | 11/2016 | Levy et al. | |
| 2018/0082252 | A1 * | 3/2018 | Wilkinson | G06Q 10/0837 |
| 2019/0012861 | A1 | 1/2019 | Soeda | |
| 2019/0057342 | A1 | 2/2019 | Ferguson et al. | |
| 2019/0287063 | A1 * | 9/2019 | Skaaksrud | B60C 5/005 |

OTHER PUBLICATIONS

Messer, "Try Before You Buy: The Next Big Thing In Ecommerce? ", Jan. 10, 2019, (Year: 2019).

Re-Turnz website ( captured on May 31, 2019 using Wayback Machine) (Year: 2019).

* cited by examiner

SYSTEMS AND METHODS OF PACKAGE CONTAINER RETURN

CROSS-REFERENCE TO RELATED APPLICATION

The present application claims priority from and is a continuation of U.S. Non-Provisional patent application Ser. No. 18/472,413, filed Sep. 22, 2023, which claims priority from and is a divisional application of U.S. Non-Provisional patent application Ser. No. 17/336,892, filed Jun. 2, 2021, issued on Oct. 24, 2023 as U.S. Pat. No. 11,797,916, which claims priority from and is a continuation application of U.S. Non-Provisional patent application Ser. No. 16/433,471, filed Jun. 6, 2019, issued on Jul. 6, 2021 as U.S. Pat. No. 11,055,656, the contents of each of which are incorporated herein by reference in their entirety.

FIELD

This disclosure relates generally to intelligent package containers that can be used to return items.

BACKGROUND

In recent years, consumers have been purchasing more products on-line. Consumers often have a return window starting from a delivery date during which items purchased on-line can be returned for a refund. Some consumers open the package soon after the package is delivered. Other consumers may be unavailable (e.g., busy or travelling) and do not open the package for days after delivery of the package. The return window is generally kept long enough (e.g., 2 weeks) so that more consumers have time to try out the items. Having such a long return window increases a likelihood of some consumers using the items during the return window and then returning the used items for a refund. Further, the items that will be returned are unavailable during the long return window for reselling to other consumers. Shortening the return window can make online shopping inconvenient for busy people who might not have time to try out an item before the shorter return window expires.

SUMMARY

This disclosure provides a package container that enables determining a trial start time based on when the package container is opened after delivery. The package container enables return windows (e.g., trial periods) to be based on opening of the package rather than an order date or a delivery date. For example, the package container includes a body, a cover, a cover lock, a user interface, and an electronic controller. The body includes a base, an opening, and at least one side wall. The base, the opening, and the at least one side wall all define a cavity therebetween. The cover is coupled to the body. The cover is movable from a closed state covering the opening to an open state. The cover lock, when activated, keeps the cover in the closed state. The electronic controller is electrically coupled to the cover lock and to the user interface. The electronic controller includes a memory and a processor. The memory is configured to store package information indicating that the package container is assigned to transport an item in the cavity. The processor is configured to, based at least in part on detecting at a first time that the cover has moved from the closed state to the open state, store the first time as a trial start time of the item in the memory. The processor is configured to store a second time as a trial end time in the memory.

Since a trial starts after a package container is opened, shorter trial periods (e.g., 2 hours) give consumers time to try out the items regardless of whether the package container is opened soon after delivery or days after delivery. The shorter trial period (e.g., 2 hours) reduces a likelihood of a consumer using an item (e.g., wearing a jacket to a party) before returning the item. Returns have to be requested within the shorter trial period in order to qualify for a refund (e.g., a full refund). For consumers who open the package container soon after delivery, any items that are to be returned are returned within the shorter trial period (e.g., 2 hours) and become available early (e.g., sooner than for a two week return window) for reselling to other consumers. The package container can also enable convenient returns. In some examples, the package container initiates, based on a trial start time, display of a reminder indicating an available time to initiate a return of an item. In a particular example, a user can activate a button (e.g., the user interface) of the package container to request a return, place the item in the package container, close the cover of the package container, and place the package container outside for pickup. In this example, the package container, based at least in part on receiving the return request, activates the cover lock of the package container, stores a second time as a trial end time and sends a transportation request to initiate transportation of the package container. In a particular example, the package container determines a trial duration based on a comparison of the trial start time and the trial end time, and selectively sends the transportation request in response to determining that the trial duration is less than or equal to a return window.

The package container can enable implementation of dynamic policies, such as return policies, trial length policies, and/or policies based on item condition, to incentivize consumers (e.g., buyers) to have greater brand loyalty. For example, responsive to receiving a return request via the package container, a dynamic policy can be activated. To illustrate, the user may be offered an extension to the return window to try out the item for a longer duration, an incentive (e.g., a partial refund, a discount on a future purchase, reward points, or a combination thereof) to keep the item. The offer may be displayed on an interface of the package container, a display of a user device, or both. In some examples, the offer is based on a condition of the item or a type of item. To illustrate, a greater incentive may be offered to keep a damaged or perishable item as compared to an undamaged or non-perishable item. In some examples, the package container enables implementation of user-specific policies, such as policies based on a relationship of the user (e.g., the customer) to a seller (e.g., retailer) of the item. To illustrate, a longer return window, a greater incentive to keep the item, or a longer extension to the return window is offered to members of a loyalty program. The package container can be used for returns of time-based rental items, such as shoes, clothes, party supplies, tools, etc. In some examples, the package container can be used for timing returns of a time-based service (e.g., a monthly service or a quarterly service), such as a try and buy service for clothing, shoes, purses, etc. In some examples, the order is placed by a user for delivery (e.g., of a gift) to someone other than the user. To illustrate, the package container may be delivered to a recipient who is different from the user who placed the order. The package container enables a recipient to return one or more received items. For example, the recipient can use a package container to return one or more items received in the same package container, another package container, or multiple package containers.

Other aspects of the disclosure will become apparent by consideration of the detailed description and accompanying drawings.

DETAILED DESCRIPTION

For ease of description, each of the exemplary systems presented herein is illustrated with a single exemplar of each of its component parts. Some examples may not describe or illustrate all components of the systems. Other exemplary embodiments may include more or fewer of each of the illustrated components, may combine some components, or may include additional or alternative components. Particular embodiments are described with reference to the drawings. In the description, common features are designated by common reference numbers throughout the drawings.

Figure 1:
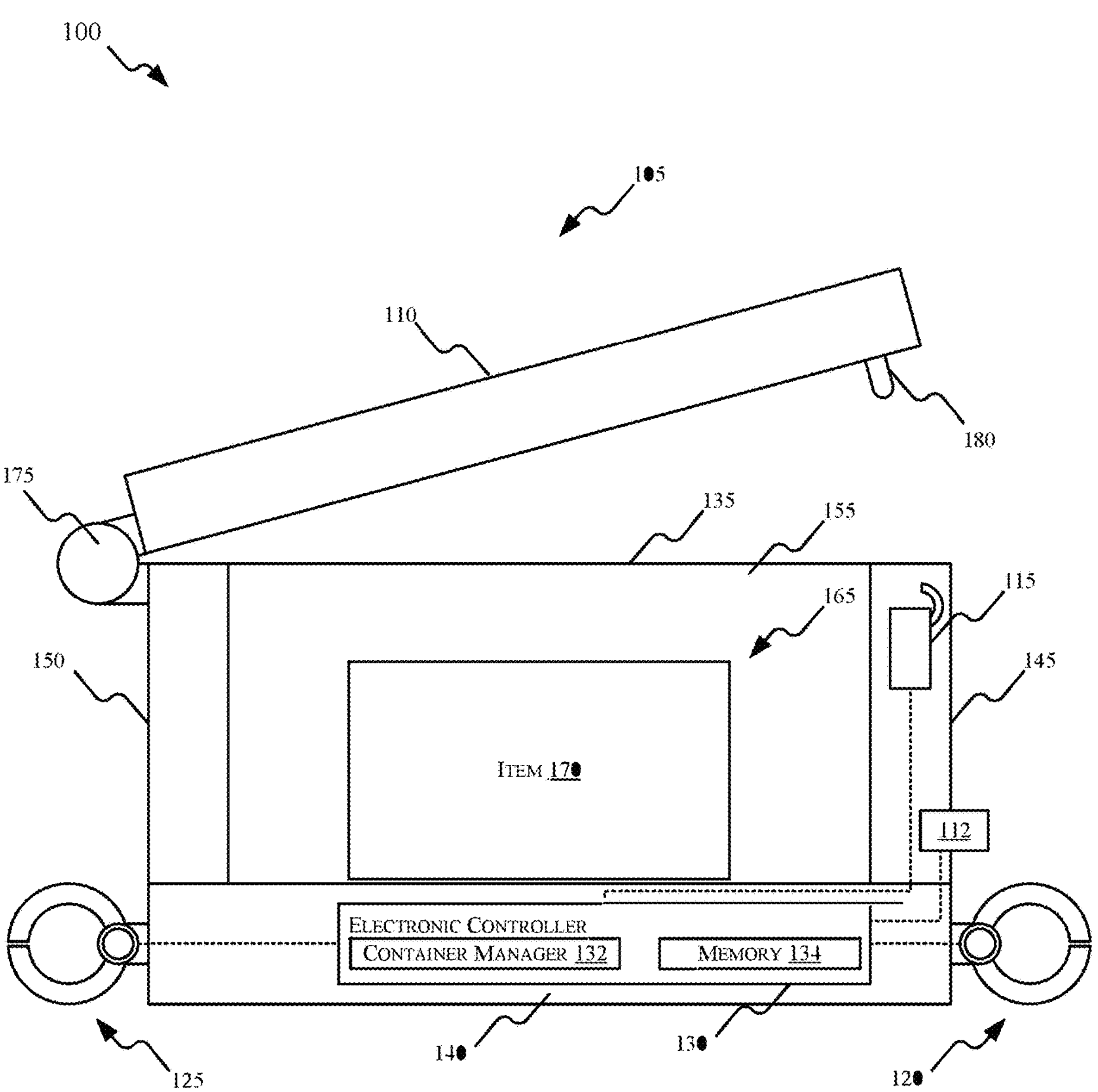
FIG. 1 is a diagram of a package container in an open state, in accordance with some embodiments.

FIG. 1 is a diagram of one exemplary embodiment of a package container 100 in an open state. The package container 100 includes a body 105, a cover 110, a cover lock 115, a first locking bar 120, a second locking bar 125, a user interface 112, and an electronic controller 130. The package container 100 described herein may include fewer, additional, or different components in different configurations than the package container 100 illustrated in FIG. 1. For example, in some embodiments, the package container 100 includes only one locking bar.

The body 105 is generally box-shaped. The body 105 includes, among other things, an opening 135, a base 140, a front 145, a back 150, a first side 155, and a second side. The second side is opposite from the first side 155. The opening 135, the base 140, the front 145, the back 150, the first side 155, and the second side define a cavity 165. The cavity 165 holds the item or items being transported. As an illustrative example, an item 170 is placed within the cavity 165 in FIG. 1. In some examples, multiple items are placed within the cavity 165. In some examples, one or more packages including one or more items are placed within the cavity 165. In alternate embodiments, the body 105 may have a generally cylindrical shape (not shown) defined by an opening, a base, and at least one side wall defining a cavity therebetween and coverable with a cover. Other configurations of the body 105 are also suitable so long as they define a cavity for placement of packages, parcels, and other items.

In the embodiment illustrated in FIG. 1, the cover 110 is pivotably coupled to the body 105 via one or more hinges 175. In other embodiments, the cover 110 is coupled to the body 105 via other types of connectors (for example, sliding connectors). In an open state (illustrated in FIG. 1), the cover 110 is positioned away from the opening 135 such that the cavity 165 is exposed and the contents within the cavity 165 are accessible. In a closed state, the cover 110 is positioned adjacent to the opening 135 such that cavity 165 is secured and the contents within the cavity 165 are not accessible.

The electronic controller 130 includes a container manager 132 (e.g., a processor) to control the package container 100. The electronic controller 130 includes memory 134 configured to store package information, order information, delivery information, trial information, item information, or a combination thereof.

The cover lock 115 is positionable in an unlocked state (illustrated FIG. 1) or a locked state (not illustrated). When the cover 110 is in the closed state and the cover lock 115 is activated (e.g., is in the locked state), the cover lock 115 engages a hook 180 included in the cover 110 to prevent the cover 110 from changing to the open state. Alternatively, when the cover lock 115 is deactivated (e.g., is in the unlocked state), the cover 110 may freely move between the closed state and the open state. The cover lock 115 is electrically coupled to the electronic controller 130. The container manager 132 adjusts the cover lock 115 between the locked and unlocked states by generating and sending control signals to the cover lock 115. In some implementations, the cover 110 includes a membrane and the package container 100 includes a closing mechanism (e.g., an actuator) that self-tightens the membrane around the item 170. In these implementations, the cover 110 is considered to be in a closed state when the membrane is in a tightened state around the item 170. The cover lock 115 is configured, when activated, to prevent the membrane from changing from the tightened state.

Upon being delivered to its destination, the package container 100 can be securely attached to a fixed anchor point via one or more securing mechanisms included in the package container 100. In some embodiments, the securing mechanism includes the first locking bar 120 and the second locking bar 125, as illustrated in FIG. 1. In some embodiments, the fixed anchor point is a bar that is attached, for example, to a spot on the ground outside the house of the recipient of the package container 100. The package container 100 remains securely attached to the fixed anchor point until the recipient of the package container 100 retrieves the contents placed within the cavity 165 of the package container 100, as described in further detail below.

In some examples, the package container 100 includes a transceiver. The user interface 112, the transceiver, or both, are operably coupled to the electronic controller 130 to control, for example, the states of the cover lock 115, the first locking bar 120, and the second locking bar 125. In some embodiments, the container manager 132 receives an unlock code from a user via the user interface 112 (or via the transceiver) and deactivates (e.g., changes the state of) the cover lock 115, the first locking bar 120, or the second locking bar 125. For example, the container manager 132 changes the cover lock 115 from the locked state to the unlocked state in response to receiving an unlock code from the recipient via the user interface 112, from the recipient via the transceiver, or from a delivery management server via the transceiver. Alternatively or in addition, the container manager 132 deactivates (e.g., unlocks) the cover lock 115 in response to performing a biometric validation. For example, the container manager 132 validates a fingerprint obtained by the user interface 112 (or received via the transceiver). The container manager 132 stores a trial start time in the memory 134 in response to deactivating the cover lock 115, detecting that the cover 110 has transitioned from the closed state to the open state for the first time subsequent to deactivation of the cover lock 115, or both.

In some examples, the user interface 112 is used to request a return of the item 170. In a particular example, the user interface 112 includes a button that is activated (e.g., pressed) by a user to request return of the package container 100. The container manager 132, based at least in part on receiving a return request via the user interface 112 (e.g., detecting an activation of the button), initiates provision of return information (e.g., return instructions) to the user, activates the cover lock 115, requests pickup of the package container 100, stores a trial end time in the memory 134, or a combination thereof, as further described with reference to FIGS. 2-4. The package container 100 can be retrieved by an authorized party (for example, a delivery person of a shipping company).

Figure 2:
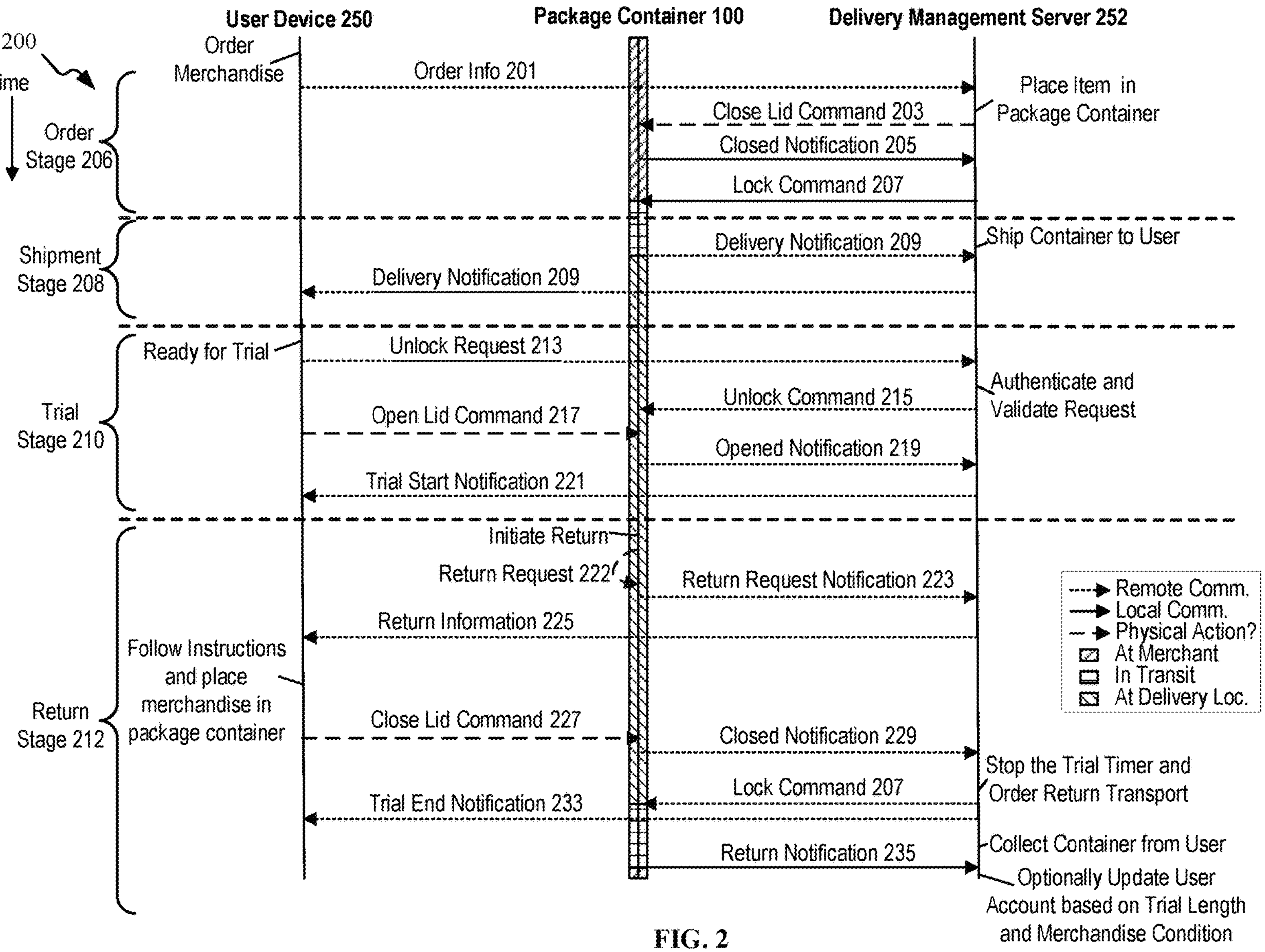
FIG. 2 is a ladder diagram of examples of communications of the package container of FIG. 1.
Figure 3:
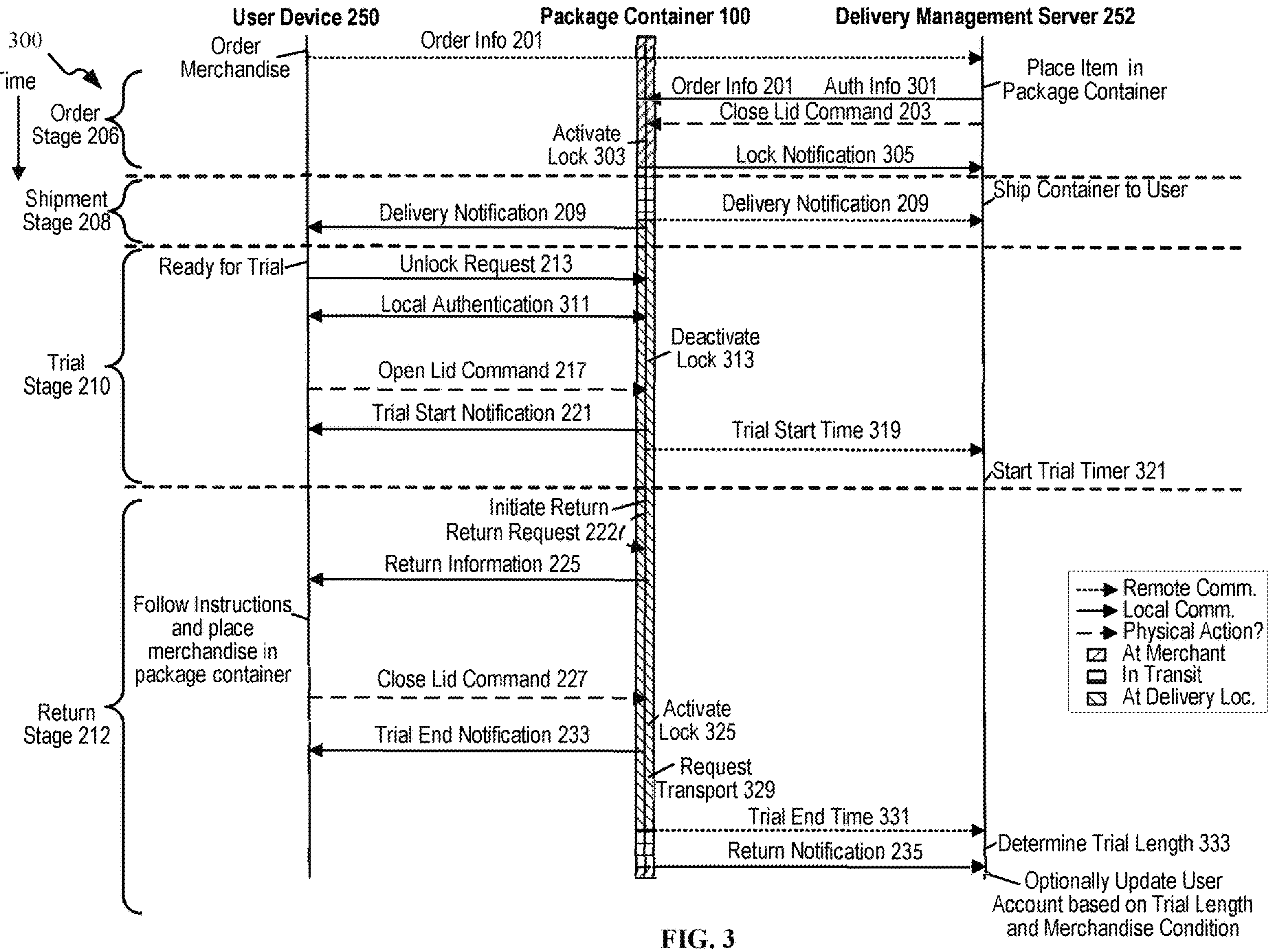
FIG. 3 is a ladder diagram of examples of communications of the package container of FIG. 1.
Figure 4:
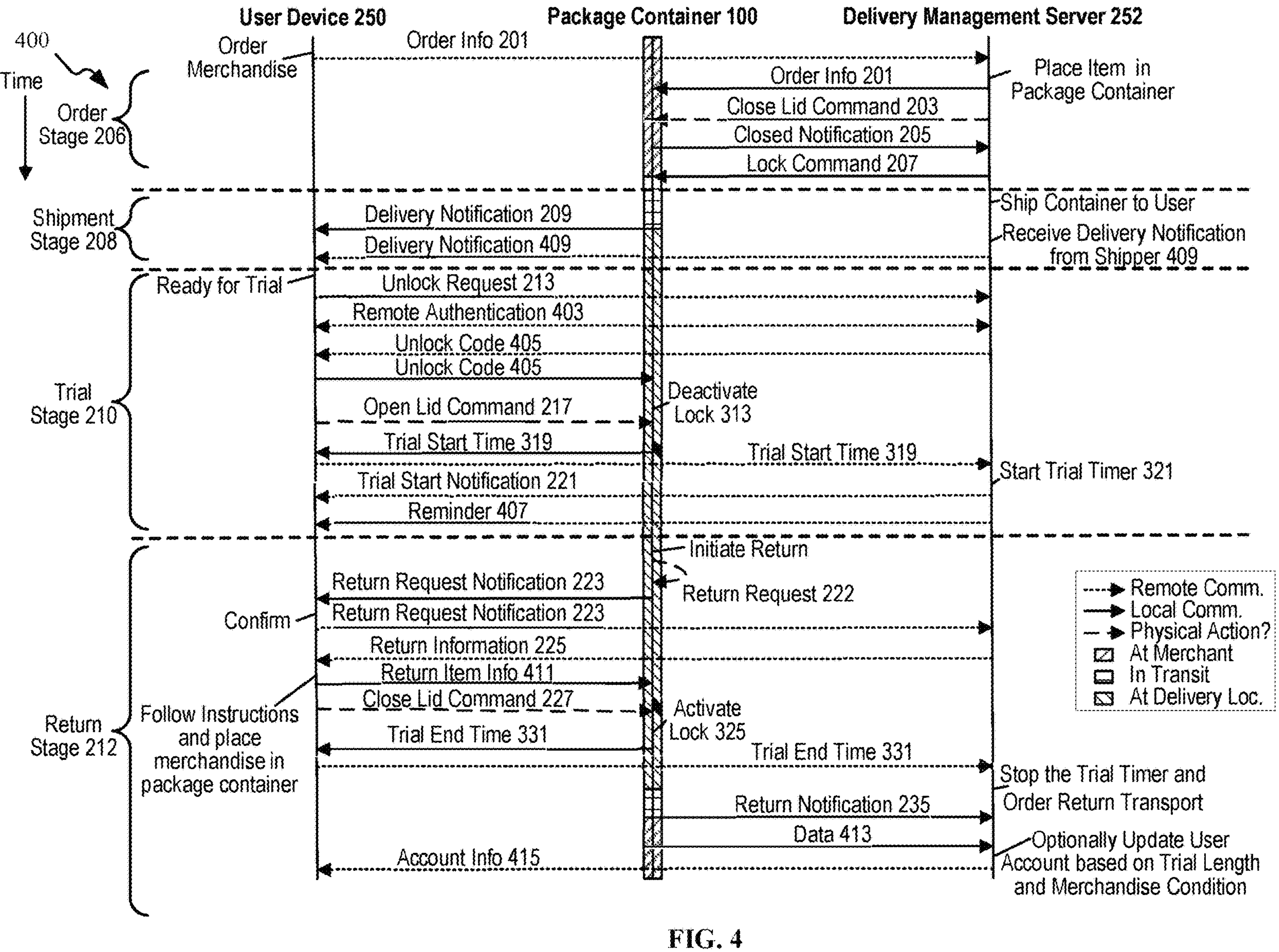
FIG. 4 is a ladder diagram of examples of communications of the package container of FIG. 1.

FIGS. 2-4 provide illustrative examples of operations at and communications between the package container 100, a user device 250, and a delivery management server 252. In other examples, fewer communications, additional communications, different communications, communications in a different order, or a combination thereof, occur between the package container 100, the user device 250, and the delivery management server 252. It should be understood that one or more operations described herein as performed by the package container 100 are performed by the container manager 132.

The delivery management server 252 is illustrated in FIGS. 2-4 as a single server for ease of description. In other examples, the delivery management server 252 refers to a delivery management system that includes multiple devices. In some examples, the delivery management system includes devices associated with multiple entities, such as a manufacturer, a seller, a retailer, a delivery company, or a combination thereof. In some examples, some of the communications described with reference to the delivery management server 252 refer to communications with servers of a first entity (e.g., the retailer) and some communications described with reference to the delivery management server 252 refer to communications with servers of a second entity (e.g., the delivery company).

The user device 250 is illustrated in FIGS. 2-4 as a single device for ease of description. In some examples, the user device 250 corresponds to multiple devices. For example, some of the communications described with reference to the user device 250 refer to communications with one or more devices of a buyer associated with (e.g., a user that placed) the order. In a particular example, some of the communications described with reference to the user device 250 refer to communications with one or more devices of a recipient of the package container 100. In some examples, the recipient differs from an intended recipient associated with the order, e.g., due to delivery errors. The user device 250 includes one or more of a mobile device, a communication device, a computer, a wi-fi network component, an internet of things device, or a smart watch. In a particular aspect, the user device 250 includes the user interface 112 and the user interface 112 is not a physically attached component of the package container 100. The user interface 112 is communicatively coupled to the package container 100. For example, the package container 100 is configured to communicate, via a transceiver, with the user interface 112. In some implementations, a user can activate the user interface 112 by selecting an option displayed by the user device 250 to request a return of the item 170.

Each of the examples illustrated in FIGS. 2-4 includes examples of communications and operations during an order stage 206, a shipment stage 208, a trial stage 210, and a return stage 212. During the order stage 206, a user places an order and, responsive to the order, one or more items (e.g., clothes, books, shoes, grocery, cosmetics, home medical tests, dry cleaning, etc.) are placed in a package container 100, e.g., by a seller or a retailer. In some examples, the delivery management server 252 selects a particular warehouse based on proximity to a delivery destination and forwards the order to the particular warehouse. An employee at the particular warehouse, in response to receiving the order, places the item 170 in the package container 100. In some examples, the delivery management server 252 determines that the item 170 located in a package container 100 that is being returned from another user. In these examples, the delivery management server 252 updates package information (e.g., order information, user information, account information, destination information, or a combination thereof) associated with the package container 100 to indicate that the package container 100 is to be shipped to the destination indicated in the order. In some examples, a package container 100 containing an item 170 being returned from one house can be routed to another house in the same street, the same neighborhood, the same city, the same state, or a combination thereof, without an intermediate stop at a warehouse to remove the item 170 from a first package container, to designate the item 170 as available for selling or rental, and to place the item 170 in a second package container.

During the shipment stage 208, the package container 100 is transported, e.g., from a warehouse or a previous delivery destination, to a delivery location (e.g., the destination indicated in the order or an incorrect destination). During the trial stage 210, a trial of the ordered items begins. For example, the trial begins at a time at which the cover lock 115 is deactivated, the cover 110 transitions from a closed state to an open state for the first time subsequent to deactivation of the cover lock 115, or both. During the return stage 212, the user initiates a return of the item 170, the trial ends, and the package container 100 is retrieved from the user.

In a particular aspect, the item 170 is returned in a second package container that is different from a first package container used to deliver the item 170. For example, multiple package containers may be delivered to the delivery location. A user may retrieve the item 170 from the first package container and initiate return of the item 170 using the second package container. In a particular aspect, the user may use the second container to initiate return of one or more additional items received in one or more package containers. In this example, a trial of the item 170 begins when the cover lock 115 of the first package container is deactivated, when the cover 110 of the first package container transitions from a closed state to an open state for the first time subsequent to deactivation of the cover lock 115, or both. The user places one or more return items (e.g., the item 170, the additional items, or a combination thereof) in the second package container. The user provides identifiers of the return items, e.g., via the user interface 112 or a transceiver of the second package container, to indicate that the return items are being returned in the second package container. In a particular aspect, one or more sensors (e.g., a camera) of the second package container provides an input indicating identifiers of the return items.

In a particular implementation, the user device 250, in response to receiving an input (e.g., a user input, a sensor input, or both) indicating that the return items are being returned in the second package container, sends a notification indicating the input to the delivery management server 252. In a particular aspect, the delivery management server 252, responsive to receiving the input identifies the orders, the retailers, the package containers, or a combination thereof, associated with the return items. For example, the delivery management server 252, responsive to receiving the input from the second package container and determining that the input indicates an identifier of the item 170, determines that the second package container is being used to return the item 170 that is associated with a particular order, the first package container, or both. In this implementation, the delivery management server 252, in response to receiving the notification, sends package information to the second package container. In an alternative implementation, the second package container receives the package information via the user interface 112.

The package information indicates that the second package container is assigned to transport the return items associated with corresponding orders. For example, the package information indicates that the second package container is assigned to transport the item 170 associated with the particular order. In a particular aspect, the package information includes order information, delivery information, trial information, or a combination thereof, associated with the orders and the package containers associated with the return items. For example, the package information indicates a trial start time associated with the first package container, a return window associated with the particular order, or both.

The trials for the return items end when the cover 110 of the second package container transitions from the open state to the closed state for the last time prior to the cover lock 115 being activated, when the cover lock 115 is activated, when the return of the second package container is initiated, when the second package container is picked up from the delivery location, or a combination thereof. In a particular aspect, the return items are associated with multiple retailers. For example, the item 170 and a second return item are associated with a first retailer and a second retailer, respectively. In a particular implementation, the return items are post-processed by return services of the multiple retailers. For example, the item 170 and the second return item are post-processed by a first return service of the first retailer and a second return service of the second retailer, respectively. In a particular implementation, a third-party service retrieves the return items from the second package container and sorts out disposition of the return items.

In an example 200 illustrated in FIG. 2, the package container 100 has limited capabilities and most actions of the container manager 132 are directed by the delivery management server 252. During the order stage 206, the user device 250, in response to receiving user input, sends order information 201 to the delivery management server 252. The order information 201 indicates an order identifier, user account information, a delivery destination, identifiers of one or more ordered items, an intended recipient identifier, or a combination thereof. For example, the order information 201 indicates that an order has been placed by the user for the ordered items to be delivered to an intended recipient at the delivery destination. The intended recipient may be the same as or different from the user.

The delivery management server 252, in response to receiving the order information 201, initiates placement of items (e.g., merchandise) in the package container 100. For example, the delivery management server 252 sends an order notification to a warehouse in response to receiving the order information 201. The order notification indicates an ordered item identifier, the order identifier, or both. An employee (or a robot) of the warehouse places the item 170 in the package container 100 responsive to the order notification. In some examples, the item 170 is different from the ordered item, e.g., due to a packing error.

In a particular implementation, the employee (or the robot) sends a packing notification to the delivery management server 252 indicating that the ordered item associated with the order has been placed in the package container 100 and that the package container 100 is ready for shipping. For example, the packing notification includes the ordered item identifier, a container identifier of the package container 100, the order identifier, or a combination thereof. The delivery management server 252, in response to receiving the packing notification, sends a close lid command 203 to the package container 100.

In a particular aspect, the delivery management server 252, in response to receiving the packing notification, sends package information to the package container 100. In an alternative aspect, the package container 100 receives the package information via the user interface 112. The container manager 132 stores the package information in the memory 134. The package information indicates that the package container 100 is assigned to transport the ordered item (e.g., the item 170) associated with the order.

The container manager 132, in response to receiving the close lid command 203 and determining that the cover 110 is in an open state, sends a command (e.g., to activate a motor or the hinges 175) to close the cover 110. The package container 100, in response to detecting that the cover 110 is in the closed state subsequent to receiving the close lid command 203, sends a closed notification 205 to the delivery management server 252.

In an alternative implementation, the cover 110 is physically closed, e.g., by the employee or the robot (instead of the close lid command 203 being sent from the delivery management server 252). In this implementation, the package container 100 sends the closed notification 205 to the delivery management server 252 in response to detecting that the cover 110 is in the closed state, receiving a user input via the user interface 112, or both.

The delivery management server 252, in response to receiving the closed notification 205, sends a lock command 207 to the package container 100. In a particular aspect, the delivery management server 252, in response to receiving the closed notification 205, updates an order status indicating that at least one item of the order is ready for shipping. The container manager 132 activates the cover lock 115 in response to receiving the lock command 207. In FIG. 2, the cover lock 115 is activated/deactivated based on commands received from the delivery management server 252. The package container 100 is considered to be located at a merchant location (e.g., a warehouse of a seller, a warehouse of a retailer, a warehouse of a delivery company, a store, a delivery vehicle, an anchor point, or a combination thereof) prior to receiving the lock command 207.

During the shipment stage 208, the package container 100 is shipped to a delivery location. For example, the package container 100 is transported to a delivery destination indicated in the order information 201. The package container 100, in response to detecting arrival at the delivery location, sends a delivery notification 209 to the delivery management server 252. The package container 100 detects arrival at the delivery location in response to receiving location information (e.g., global positioning system (GPS) information or an anchor point identifier) indicating that the package container 100 has arrived at the delivery destination, receiving a user input via the user interface 112 (or a transceiver) indicating that the package container 100 has been delivered, or both. The package container 100 is considered to be in transit between receiving the lock command 207 and sending the delivery notification 209.

In a particular aspect, the delivery management server 252, in response to receiving the delivery notification 209, updates an order status indicating that the ordered item (e.g., the item 170) has been delivered. In a particular aspect, the delivery management server 252, in response to receiving the delivery notification 209 from the container manager 132, sends the delivery notification 209 to the user device 250 (e.g., a device of the buyer, a device of the intended recipient, or both). For example, the delivery management server 252 sends, to the user device 250, the order status indicating that the ordered item has been delivered. In FIG. 2, the package container 100 initiates sending of the delivery notification 209 to the user device 250 by sending the delivery notification 209 to the delivery management server 252.

During the trial stage 210 (e.g., when a recipient is ready for trial subsequent to receiving the package container 100), the recipient sends an unlock request 213 via (e.g., an on-line shopping application of) a device of the recipient (e.g., the user device 250) to the delivery management server 252. In a particular aspect, the unlock request 213 includes the container identifier, credentials (e.g., a username, a password, biometric information, or a combination thereof) of the recipient, or a combination thereof.

The delivery management server 252, in response to receiving the unlock request 213 and authenticating the recipient, sends an unlock command 215 to the container manager 132. In a particular aspect, the delivery management server 252 identifies the order associated with the container identifier, authenticates the recipient in response to determining that the credentials match authentication information associated with the intended recipient, and sends the unlock command 215 in response to authenticating the recipient.

The container manager 132 deactivates the cover lock 115 in response to receiving the unlock command 215 from the delivery management server 252. In a particular aspect, the container manager 132, in response to deactivating the cover lock 115, updates the user interface 112 to indicate that the cover lock 115 is deactivated. In a particular aspect, the cover lock 115 generates a sound, a light, or both, while transitioning from a locked state to an unlocked state. In this aspect, the recipient determines that the cover lock 115 is deactivated in response to detecting the sound, the light, or both.

In a particular implementation, the recipient sends an open lid command 217 via the online shipping application of the recipient's device (e.g., the user device 250) to the container manager 132. The container manager 132, in response to receiving the open lid command 217, determining that the cover lock 115 is deactivated, and determining that the cover 110 is in a closed state, sends a command (e.g., to activate a motor or the hinges 175) to open the cover 110. In an alternative implementation, the cover 110 is physically opened, e.g., by the recipient (instead of the open lid command 217 being sent from the user device 250).

The container manager 132 detects at an opened time that the cover 110 has moved from the closed state to the open state. The container manager 132, in response to detecting that the cover 110 has moved from the closed state to the open state for the first time subsequent to receiving the unlock command 215, sends an opened notification 219 to the delivery management server 252, stores the opened time as a trial start time in the memory 134, or both. In a particular aspect, a trial of the ordered item (e.g., the item 170) starts at the trial start time. The delivery management server 252, in response to receiving the opened notification 219, sends a trial start notification 221 to the user device 250 (e.g., a device of the recipient, a device of the buyer, or both). The package container 100 thus initiates sending of the trial start notification 221 to the user device 250 by sending the opened notification 219 to the delivery management server 252. In a particular aspect, the delivery management server 252 stores a server trial start time based on an unlock request time at which the unlock request 213 is received from the user device 250, an unlock command time at which the unlock command 215 is sent to the package container 100, an opened time at which the opened notification 219 is received from the package container 100, a trial notification time at which the trial start notification 221 is sent to the user device 250, or a combination thereof.

In a particular aspect, the user device 250 displays the trial start notification 221. For example, the user device 250 provides the trial start notification 221 to a display. The trial start notification 221 indicates that a trial of the ordered item (e.g., the item 170) has started. In a particular example, the trial start notification 221 indicates terms and conditions of the trial. To illustrate, the trial start notification 221 indicates that a return has to be requested by a particular time (e.g., 2 hours or 1 day) to get a particular refund (e.g., 100% or 50%).

In a particular aspect, the container manager 132 determines a reminder time based on the trial start time (e.g., 10:00 AM). For example, a trial duration threshold (e.g., 2 hours) indicates a size of a return window. The container manager 132 determines the reminder time based on the trial start time and the trial duration threshold (e.g., reminder time=trial start time+0.75 (trial duration threshold)). The container manager 132 generates a reminder indicating an available time (e.g., available time=0.25 (trial duration threshold)) to initiate a return of the item 170. The container manager 132 initiates display of the reminder based on the reminder time. For example, the container manager 132 provides the reminder to the user interface 112, the user device 250, or both, for display. In a particular aspect, the delivery management server 252 determines a second reminder time based on the trial start time and the trial duration threshold, generates a second reminder indicating an available time to return the item 170, and initiates display of the second reminder at the second reminder time. For example, the delivery management server 252 provides the second reminder to the user interface 112, the user device 250, or both for display. In some examples, the reminder time (and the available time indicated by the reminder) is different from the second reminder time (and the available time indicated by the second reminder). In a particular aspect, the container manager 132, the delivery management server 252, or both, initiate a display of a reminder in response to determining that the package container 100 has not been opened (e.g., the cover 110 has not transitioned from a closed state to an open state) within a threshold duration of delivery of the package container 100.

The recipient may decide that the item 170 is to be returned for various reasons, such as the item 170 is different from the ordered item or the item 170 is the ordered item but the recipient does not want to keep the item 170 after seeing or trying out the item 170. During the return stage 212, the recipient initiates return of the item 170 by sending a return request 222 via the user interface 112 to the package container 100. In a particular aspect, the user interface 112 includes a button on the package container 100 and the recipient presses the button to initiate the return. In some examples, the package container 100 includes a button cover to prevent the button from being accidently pressed, e.g., during transportation of the package container 100. The recipient moves (e.g., lifts) the button cover to access the button and presses the button to initiate the return. It should be understood that a button is provided as an illustrative example. In some examples, the user interface 112 includes a touch screen, a lever, a microphone, or other input devices and the package container 100 includes an interface cover that prevents accidental access to at least a portion (e.g., the touch screen, the lever, the microphone, or other input device) of the user interface 112. In a particular aspect, at least a portion (e.g., a button, a touch screen, a lever, a microphone, or other input device) of the user interface 112 is located at an exterior surface (e.g., outer surface) of at least one of the cover 110 or the body 105. In a particular aspect, at least a portion (e.g., a button, a touch screen, a lever, a microphone, or other input device) of the user interface 112 is accessible while the cover 110 is in an open state and is inaccessible while the cover 110 is in a closed state. In a particular aspect, at least a portion (e.g., a button, a touch screen, a lever, a microphone, or other input device) of the user interface 112 is disabled subsequent to expiration of the return window.

Returning to the return stage 212, the container manager 132 generates a return request notification 223 in response to receiving the return request 222 from the user interface 112. In a particular aspect, the container manager 132 sends a confirmation request to the user device 250 in response to receiving the return request 222. The user device 250 receives a user input responsive to displaying the confirmation request and sends the user input to the container manager 132. In this aspect, the container manager 132 generates the return request notification 223 in response to determining that the user input indicates a confirmation that return is requested. In a particular aspect, the user interface 112 requests the recipient to indicate recipient return information, such as the ordered item, the item to be returned, the order number, a reason for returning the item, or a combination thereof. In this aspect, the container manager 132, in response to receiving user input indicating the recipient return information (e.g., the ordered item identifier, an item identifier of the item 170, the order identifier, a reason, or a combination thereof), generates the return request notification 223 indicating the recipient return information. In a particular aspect, the return request notification 223 indicates the container identifier of the package container 100. The container manager 132 sends the return request notification 223 to the delivery management server 252. In a particular aspect, the container manager 132 stores a request time in the memory 134. The request time is based on a time at which the return request 222 is received by the container manager 132.

In a particular aspect, the user device 250 generates the return request notification 223 in response to receiving a user input indicating the return request 222. In a particular aspect, the container manager 132, responsive to receiving the return request 222, refrains from requesting the recipient to provide recipient return information. In this aspect, the delivery management server 252, in response to receiving the return request notification 223, sends a request for the recipient return information to the user device 250, the package container 100, or both. The user device 250 (or the package container 100) displays the request for the recipient return information, receives user input indicating the recipient return information, and sends the recipient return information to the delivery management server 252. The recipient return information includes an ordered item identifier, an item identifier of the item 170, the order identifier, a reason for returning the item 170, a container identifier of the package container 100, or a combination thereof.

The delivery management server 252 generates return information 225 in response to receiving the return request notification 223, the recipient return information, or both. In a particular aspect, the return information 225 includes instructions for returning the item 170, instructions for proper use of the item 170, assembly instructions for the item 170, comments on the reason for returning the item 170, an offer to extend a return window by a particular duration, an incentive (e.g., a partial refund, a discount on a future purchase, reward points, or a combination thereof) to keep the item 170, an incentive to return the item 170 sooner, or a combination thereof.

The delivery management server 252, the package container 100, and the user device 250 enable implementation of various tiers of return policies and incentives to customers (e.g., buyers, recipients, or a combination thereof) that can be dynamically adjusted over time based upon various factors and conditions. In a particular example, the offer to extend the return window indicates a longer duration for recipients that are members of a loyalty program. As another example, the offered incentives to keep the item 170 are based on a condition of the item 170 detected based on sensor information received from the package container 100.

In a particular example, the recipient may want to return the item 170 because of a common user mistake in using the item 170 and the return information 225 indicates the proper use of the item 170. In a particular example, a customer service agent may review the reason for returning the item 170, provide comments addressing the reason, and the return information 225 includes the comments. The delivery management server 252 sends the return information 225 to the user device 250, the package container 100, or both. In a particular aspect, the package container 100 thus initiates sending of the return information 225 to the user device 250 by sending the return request notification 223 to the delivery management server 252.

The user device 250 displays the return information 225. The recipient may follow the instructions to return the item 170. In a particular example, the instructions to return the item 170 indicate that the item 170 is to be placed in the package container 100, the cover 110 is to be closed, and the package container 100 is to be placed at a particular location (e.g., an anchor point) for pick up. The recipient places the item 170 in the package container 100. In a particular aspect, the recipient sends a close lid command 227 via the user device 250 to the package container 100. The container manager 132, in response to receiving the close lid command 227 and determining that cover 110 is in an open state, sends a command to move the cover 110 from the open state to a closed state. In an alternative aspect, the recipient physically closes the cover 110 (e.g., instead of sending the close lid command 227 to the package container 100). The container manager 132, in response to determining that the cover 110 is in the closed state subsequent to receiving the return request 222, sends a closed notification 229 to the delivery management server 252.

In a particular aspect, the recipient has a first time period (e.g., 15 minutes) subsequent to sending the return request 222 to change their mind about returning the item 170. For example, the recipient may change their mind based on receiving the return information 225. To illustrate, the recipient may, via the user interface 112 or the user device 250, accept the offer of an extended return window or accept the incentive to keep the item 170. Accepting the offer of the extended return window increases the return window by a particular duration and cancels the requested return. In a particular aspect, accepting the incentive to keep the item 170 corresponds to expiration (e.g., a reduction) of the return window and cancelation of the requested return. In a particular aspect, the recipient can cancel the requested return via the user interface 112. For example, the recipient can press the button again to cancel the requested return. In a particular example, the button emits a first light (e.g., a red light) to indicate that a return is requested and a second light (e.g., a green light) to indicate that a return is canceled/not requested. In a particular aspect, the container manager 132 can automatically cancel the requested return based at least in part on detecting that the cover 110 is in an open state at the end of the first time period. For example, the container manager 132, in response to detecting that the cover 110 is in an open state during (e.g., the last 5 minutes of) the first time period, initiate display of an alert indicating that the user should place the item 170 in the package container 100 and close the cover 110 by the end of the first time period to continue with the return. The container manager 132 cancels the return in response to determining that the cover 110 is in the open state at the end of the first time period. The container manager 132, in response to determining that return has not been canceled within the first time period and that the cover 110 is in the closed state, sends the closed notification 229 to the delivery management server 252. In a particular aspect, the container manager 132 stores a closed time in the memory 134. The closed time is based on a time at which the cover 110 is detected as moving from the opened state to the closed state, a time at which the cover 110 is detected to be in the closed state, a time at which the closed notification 229 is sent to the delivery management server 252, or a combination thereof.

In a particular aspect, the delivery management server 252, in response to receiving the closed notification 229, checks whether the trial has ended within the return window. For example, the delivery management server 252 stores a server trial end time that is based on a time at which the closed notification 229 is received by the delivery management server 252. The delivery management server 252 determines a server trial duration based on a comparison of the server trial start time and the server trial end time. The delivery management server 252 determines that the trial has ended within the return window in response to determining that the server trial duration satisfies (e.g., is less than or equal to) a trial duration threshold (e.g., return window+tolerance threshold). In a particular example, the recipient closes the cover 110 at a first time, the recipient sends the return request 222 at a second time, a time period to cancel the return expires at a third time, the container manager 132 sends the closed notification 229 at a fourth time, and the delivery management server 252 receives the closed notification 229 at a fifth time. In a particular aspect, the tolerance threshold accounts for an expected delay between the second time (when the cover 110 is closed and the return request 222 is sent) and the fifth time (when the delivery management server 252 receives the closed notification 229).

The delivery management server 252, in response to determining that the trial has not ended within the return window, sends an invalid return alert to the package container 100, the user device 250, or both. The package container 100, the user device 250, or both, display the invalid return alert. In a particular example, the invalid return alert indicates that the trial period has expired, that automatic return of the ordered item (e.g., the item 170) is no longer available, that the recipient can contact customer service for further assistance, or a combination thereof.

The delivery management server 252, in response to receiving the closed notification 229, determining that the trial has ended within the return window, or both, initiates retrieval of the package container 100, sends the lock command 207 to the package container 100, sends a trial end notification 233 to the user device 250, or a combination thereof. For example, the delivery management server 252, in response to receiving the closed notification 229, sends a delivery request to a delivery truck to retrieve the package container 100 from the delivery destination (e.g., the previous delivery destination). In a particular aspect, the delivery request indicates a next delivery destination of the package container 100. For example, the next delivery destination indicates a warehouse or a second delivery destination (e.g., associated with a second order). In a particular example, the delivery management server 252, in response to receiving the closed notification 229, generates the trial end notification 233 indicating that the trial of the ordered item (e.g., the item 170) has ended. For example, the trial end notification 233 indicates that the trial of the ordered item (e.g., the item 170) has ended. In a particular aspect, the trial end notification 233 indicates information regarding pickup of the package container 100. For example, the trial end notification 233 indicates that retrieval of the package container 100 has been initiated, that the package container 100 has to be available for retrieval at a particular location by a particular time, that a refund for the ordered item (e.g., the item 170) is being processed, that a refund for the ordered item (e.g., the item 170) will be processed subsequent to retrieval of the package container 100, or a combination thereof. The user device 250 displays the trial end notification 233. The container manager 132, in response to receiving the lock command 207 and detecting that the cover 110 is in an opened state, displays an alert, initiates cancelation of the return request, or both. Alternatively, the container manager 132 activates the cover lock 115 in response to receiving the lock command 207 and detecting that the cover 110 is in a closed state. In a particular aspect, the package container 100 is considered to be at the delivery location between sending the delivery notification 209 and receiving the lock command 207.

In a particular aspect, the recipient places the package container 100 at a pickup location (e.g., at an anchor point or outside a front door) after receiving the trial end notification 233 and the package container 100 is retrieved by the delivery truck. It should be understood that a delivery truck retrieving the package container 100 is used as an illustrative example. The package container 100 can be transported using one or more modes of transportation, such as a human carrier, a robot, a bicycle, an aircraft, a truck, a van, an unmanned aerial vehicle, a self-driving vehicle, a watercraft, or a combination thereof. In a particular aspect, the container manager 132 detects a location of the package container 100 (e.g., a container location) in response to receiving location information (e.g., global positioning system (GPS) information or an anchor point identifier) indicating that the package container 100 has arrived at the location, receiving a user input via the user interface 112 (or a transceiver) indicating that the package container 100 has arrived at the location, or both. In a particular aspect, the location information is based on a location of a GPS receiver of the package container 100, a location of a GPS receiver of a transportation vehicle, a location of a location beacon, or a combination thereof. The container manager 132, in response to determining that the container location includes a location of an anchor point, a location of a transportation vehicle, a location of a warehouse, a location of an airport, a location of a transportation hub, or a combination thereof, detects arrival of the package container 100 at a merchant location. The container manager 132, in response to detecting arrival at the merchant location, sends a return notification 235 to the delivery management server 252.

In a particular aspect, the container manager 132 sends package data to the delivery management server 252 in response to detecting arrival at the merchant location. In an alternative aspect, the delivery management server 252 retrieves the package data from the package container 100 in response to receiving the return notification 235. The package data includes the trail start time (e.g., a package trial start time), the trial end time (e.g., a package trial end time), or both. In a particular aspect, the delivery management server 252 sends an alert to a device of a customer services representative in response to determining that a difference between the server trial start time and the package trial start time exceeds a trial start time threshold, that a difference between the server trial end time and the package trial end time exceeds a trial end time threshold, or both. In a particular aspect, the delivery management server 252 updates the server trial start time and the server trial end time based on the package trial start time and the package trial end time, respectively.

In a particular aspect, the delivery management server 252 determines a return time based on a time at which the return notification 235 is received. In a particular aspect, the delivery management server 252 determines a return duration based on a comparison of the server trial end time and the return time. In a particular aspect, the delivery management server 252 sends an alert to a device of a customer services representative in response to determining that a difference between the server trial end time and the return duration exceeds a return time threshold.

In a particular aspect, the delivery management server 252 determines a refund amount based on the server trial duration, the return duration, or both. For example, a shorter return duration corresponds to a higher refund amount to incentivize the recipient to make the package container 100 available for pickup soon after receiving the trial end notification 233. In a particular aspect, the delivery management server 252 determines the refund amount based at least in part on the item 170. For example, a customer service agent retrieves the item 170 from the package container 100 and provides item condition information to the delivery management server 252. In another example, the delivery management server 252 receives the item condition information based on input received from one or more sensors (e.g., a camera), the package container 100, or a combination thereof. The delivery management server 252 adjusts the refund amount based at least in part on the item condition information. In a particular example, the delivery management server 252 reduces the refund amount in response to determining that the item condition information indicates that the item 170 is badly damaged. In another example, the delivery management server 252 increases the refund amount in response to determining that the item condition information indicates that the item 170 is badly damaged and determining that the data retrieved from the package container 100 indicate that the package container 100 experienced transport conditions (e.g., strong and abrupt movement, a higher than threshold temperature, a lower than threshold temperature, etc.) that could have caused the damage to the item 170 during transportation to or from the delivery location. In a particular aspect, the delivery management server 252 sends refund information (e.g., the refund amount and explanation regarding calculation of the refund amount) to the user device 250, updates an account of the buyer based on the refund information, updates an account of the recipient based on the refund information, or a combination thereof.

In an example 300 illustrated in FIG. 3, the package container 100 has enhanced capabilities and has less reliance on remote communications with the delivery management server 252. During the order stage 206 of the example 300, the delivery management server 252, in response to receiving the order information 201, sends the order information 201, authentication information 301, or both, to the package container 100. The package container 100 stores the order information 201, the authentication information 301, or both, in the memory 134. In a particular aspect, the delivery management server 252 provides the authentication information 301 to the package container 100 to enable the package container 100 to perform local authentication (as compared to relying on the delivery management server 252 to perform remote authentication, as described in reference to the example 200) of a recipient of the package container 100, as described herein.

The container manager 132 activates the cover lock 115, at 303, in response to detecting that the cover 110 is in the closed state, receiving user input indicating that the cover 110 is to be locked, or both (as compared to in response to receiving the lock command 207 from the delivery management server 252), as described with reference to the example 200). The container manager 132 sends a lock notification 305 to the delivery management server 252 in response to activating the cover lock 115. In a particular aspect, the delivery management server 252, in response to receiving the lock notification 305, updates an order status indicating that at least one item of the order is ready for shipping. The package container 100 is considered to be located at a merchant location (e.g., a warehouse of a seller, a warehouse of a retailer, a warehouse of a delivery company, a store, a delivery truck, an anchor point, or a combination thereof) prior to sending the lock notification 305.

During the shipment stage 208 of the example 300, the container manager 132, in response to detecting arrival at the delivery location, sends the delivery notification 209 to the user device 250, the delivery management server 252, or both (as compared to the delivery management server 252 forwarding the delivery notification 209 from the package container 100 to the user device 250, as described with reference to the example 200). The package container 100 is considered to be in transit between sending the lock notification 305 and sending the delivery notification 209.

During the trial stage 210 of the example 300, the user device 250 sends the unlock request 213 to the package container 100 to trigger local authentication 311 (as compared to sending the unlock request 213 to the delivery management server 252 to trigger remote authentication at the delivery management server 252, as described with reference to the example 200). For example, the container manager 132 performs local authentication 311 by comparing user credentials indicated in the unlock request 213 with the authentication information 301. To illustrate, the container manager 132 determines that authentication is successful in response to determining that the user credentials match the authentication information 301. The container manager 132 deactivates the cover lock 115, at 313, in response to determining that the authentication is successful. The container manager 132 sends the trial start notification 221 to the user device 250 (as compared to sending the opened notification 219 to the delivery management server 252 to trigger sending of the trial start notification 221 from the delivery management server 252 to the user device 250, as described with reference to the example 200) in response to detecting, for the first time subsequent to deactivating the cover lock 115, that the cover 110 is in the opened state at an opened time. The container manager 132 determines a trial start time 319 based on the opened time, a time at which the trial start notification 221 is sent to the user device 250, or both. The container manager 132 sends the trial start time 319 to the delivery management server 252. The delivery management server 252 starts a trial timer, at 321. For example, the delivery management server 252 stores the trial start time 319 as a server trial start time.

During the return stage 212 of the example 300, the container manager 132, in response to receiving the return request 222, sends the return information 225 to the user device 250 (as compared to sending the return request notification 223 to the delivery management server 252 to trigger sending of the return information 225 from the delivery management server 252 to the user device 250, as described with reference to the example 200). The container manager 132 activates the cover lock 115, at 325, in response to determining that the cover 110 is in the closed state subsequent to receiving the return request 222 (as compared to in response to receiving the lock command 207 from the delivery management server 252, as described with reference to the example 200 of FIG. 2). The container manager 132, subsequent to activating the cover lock 115, sends the trial end notification 233 to the user device 250 (as compared to sending the closed notification 229 to the delivery management server 252 to trigger the delivery management server 252 to send the trial end notification 233 to the user device 250, as described with reference to the example 200). The container manager 132 requests transport, at 329, subsequent to sending the trial end notification 233 to the user device 250. For example, the container manager 132 sends a delivery request to a delivery truck to retrieve the package container 100 from the delivery destination.

The container manager 132 determines a trial end time 331 based on a closed time at which the cover 110 is detected as closed subsequent to receiving the return request 222, a lock time at which the cover lock 115 is activated, a trial end notification time at which the trial end notification is sent to the user device 250, a request transport time at which the delivery request is sent, or a combination thereof. The container manager 132 sends the trial end time 331 to the delivery management server 252. In a particular aspect, the package container 100 is considered to be at the delivery location between sending the delivery notification 209 and sending the trial end time 331. The delivery management server 252 stores the trial end time 331 as the server trial end time. The delivery management server 252 determines a server trial duration based on a comparison of the server trial start time and the server trial end time, at 333. In a particular aspect, the package container 100 is considered to be in transit between sending the trial end time 331 and sending the return notification 235.

In example 400 of FIG. 4, the package container 100 has limited capabilities and relies on the user device 250 for remote communication with the delivery management server 252. During the shipment stage 208 of the example 400, the delivery management server 252 receives a delivery notification 409 from a delivery system (e.g., a delivery vehicle) indicating that the package container 100 has arrived at the delivery location. The delivery management server 252 forwards the delivery notification 409 received from the delivery system to the user device 250 (e.g., a user device associated with the intended recipient, a user device associated with the buyer, or both). In a particular aspect, the container manager 132, in response to detecting arrival at the delivery location, sends the delivery notification 209 to the user device 250 (as compared to sending the delivery notification 209 to the delivery management server 252, as described with reference to the example 200). The user device 250 receives the delivery notification 409 (generated by the delivery system) from the delivery management server 252, the delivery notification 209 (generated by the container manager 132) from the package container 100, or both. In a particular aspect, the package container 100 is considered to be in transit between receiving the lock command 207 and sending the delivery notification 209. In a particular aspect, the package container 100 is considered to be in transit between receiving the lock command 207 and the delivery management server 252 receiving the delivery notification 409.

During the trial stage 210 of the example 400, the user device 250 sends the unlock request 213 to the delivery management server 252 (as compared to sending the unlock request 213 to the package container 100, as described with reference to the example 200). The delivery management server 252 performs remote authentication 403, in response to receiving the unlock request 213 from the user device 250. For example, the unlock request 213 indicates user credentials and the delivery management server 252 authenticates the unlock request 213 based on a comparison of the user credentials and the authentication information 301. The delivery management server 252, in response to determining that the user credentials match the authentication information 301, sends an unlock code 405 to the user device 250. The user device 250 forwards the unlock code 405 received from the delivery management server 252 to the package container 100. The container manager 132 deactivates the cover lock 115, at 313, in response to determining that the unlock code 405 matches a valid unlock code of the package container 100. In a particular aspect, the unlock code 405 received from the delivery management server 252 is digitally signed using an encryption key of the package container 100, an encryption key of the delivery management server 252, or both. For example, the unlock code 405 received from the delivery management server 252 is digitally signed using a private encryption key of the delivery management server 252 and the container manager 132 extracts the unlock code 405 using a public encryption key of the delivery management server 252. In the example 400, the delivery management server 252 performs the remote authentication 403 as compared to the package container 100 performing local authentication 311 (as described with reference to the example 300).

The container manager 132, in response to detecting that the cover 110 is an opened state subsequent to deactivating the cover lock 115, sends the trial start time 319 to the user device 250 (as compared to sending the trial start time 319 to the delivery management server 252, as described with reference to the example 300 of FIG. 3). The user device 250 forwards the trial start time 319 received from the package container 100 to the delivery management server 252. In a particular aspect, the trial start time 319 received from the package container 100 is digitally signed using an encryption key of the package container 100, an encryption key of the user device 250, an encryption key of the delivery management server 252, or a combination thereof.

The delivery management server 252 sends the trial start notification 221 to the user device 250 in response to receiving the trial start time 319 from the user device 250 (as compared to receiving the opened notification 219 from the package container 100, as described with reference to the example 200). In a particular aspect, the delivery management server 252 generates a reminder 407 and sends the reminder 407 to the user device 250. For example, the delivery management server 252 determines a reminder time based on the trial start time 319 (e.g., 10:00 AM) and a trial duration threshold (e.g., reminder time=trial start time+0.75 (trial duration threshold)). The delivery management server 252 generates the reminder 407 indicating an available time (e.g., available time=0.25 (trial duration threshold)) to initiate a return of the item 170. The delivery management server 252 initiates display of the reminder 407 based on the reminder time. For example, the delivery management server 252 sends the reminder 407 to the user device 250 at approximately the reminder time, sends a request to the user device 250 to display the reminder 407 at the reminder time, or both. The user device 250 displays the reminder 407.

During the return stage 212 of the example 400, the container manager 132, responsive to receiving the return request 222 from the user interface 112, sends the return request notification 223 to the user device 250 (as compared to sending the return request notification 223 to the delivery management server 252, as described with the example 200). In a particular aspect, the user interface 112 sends the return request 222 to the container manager 132 in response to detecting that a user has activated the user interface 112 (e.g., pressed a button). The user device 250 forwards the return request notification 223 received from the package container 100 to the delivery management server 252. In a particular aspect, the return request notification 223 is sent to the user device 250 of a buyer, the user device 250 of an intended recipient, or both. In a particular aspect, the user device 250 displays the return request notification 223 and selectively forwards the return request notification 223 to the delivery management server 252 responsive to a user input confirming the return request. The user confirmation prevents a return request initiated by an unauthorized user (e.g., other than the buyer or intended recipient, such as a child playing with the package container 100) to be sent to the delivery management server 252.

In a particular aspect, the return information 225 requests information regarding the item being returned. The user device 250 provides return item information 411 to the package container 100. For example, the return item information 411 includes an ordered item identifier of the ordered item, an item identifier of the item 170, a reason for returning the item 170, or a combination thereof.

In a particular aspect, the container manager 132, subsequent to activating the cover lock 115, sends the trial end time 331 to the user device 250 (as compared to sending the trial end time 331 to the delivery management server 252, as described with reference to the example 300). The user device 250 forwards the trial end time 331 received from the package container 100 to the delivery management server 252.

The container manager 132, in response to detecting arrival of the package container 100 at the merchant location, sends data 413 to the delivery management server 252. For example, the container manager 132 sends the data 413 concurrently with sending the return notification 235 to the delivery management server 252. In a particular aspect, the data 413 includes the return item information 411, sensor input from one or more sensors, a trial start time, a trial end time, a timestamped listing of communications sent or received, or a combination thereof. In a particular aspect, the delivery management server 252 adjusts a refund amount based at least in part on the data 413. For example, the delivery management server 252 reduces the refund amount in response to determining that data 413 indicates that the item 170 is badly damaged. In another example, the delivery management server 252 increases the refund amount in response to determining that the data 413 includes a photograph indicating that the item 170 is badly damaged and that the data 413 includes sensor data indicating the package container 100 experienced transport conditions (e.g., strong and abrupt movement, a higher than threshold temperature, a lower than threshold temperature, etc.) that could have caused the damage to the item 170 during transportation to the delivery location. In a particular aspect, the delivery management server 252 sends account information 415 (e.g., the refund amount and explanation regarding calculation of the refund amount) to the user device 250, updates an account of the buyer based on the account information 415, updates an account of the recipient based on the account information 415, or a combination thereof.

The package container 100 can thus be used for all three examples (200-400) depending on security requirements, supported capabilities, or a combination thereof. One or more operations of the examples 200-400 can be mixed and matched. For example, the delivery management server 252 can send the unlock code 405 to the user device 250 (as compared to sending the unlock command 215 to the package container 100) in the example 200. The package container 100 enables a trial to start after the package container 100 is opened. Since the trial starts after the package container 100 is opened, a shorter trial period (e.g., 2 hours) gives a recipient time to try out the item 170 regardless of whether the package container 100 is opened soon after delivery or days after delivery. The shorter trial period (e.g., 2 hours) reduces a likelihood of the recipient using the item 170 (e.g., wearing a jacket to a party) before returning the item 170. For a recipient who open the package container 100 soon after delivery and decides to return the item 170, the item 170 has to be returned within the shorter trial period (e.g., 2 hours) for a refund (e.g., a full refund) and becomes available early (e.g., sooner than for a two week return window) for reselling to other consumers. In some examples, if the package container 100 is not opened within a threshold duration of delivery, a reminder can be displayed to encourage the recipient to open the package container 100, to inform the recipient regarding an available trial time remaining to receive a refund (e.g., a full refund available for another 6 hours, a half refund available after 6 hours, and non-refundable after 1 day), or both. In some examples, if the package container 100 is not opened and remains attached to an anchor point within a threshold duration of delivery, the container manager 132 (or the delivery management server 252) requests transport. For example, the container manager 132 (or the delivery management server 252) sends a delivery request to a delivery truck to retrieve the package container 100 from the delivery destination.

The package container 100 can also enable convenient returns. For example, the recipient can activate a button (e.g., the user interface 112) of the package container 100 to request a return, place the item 170 in the package container 100, close the cover 110 of the package container 100, and place the package container 100 outside for pickup. The package container 100 activates the cover lock 115 of the package container 100 and sends a transportation request to initiate transportation of the package container 100.

Figure 5:
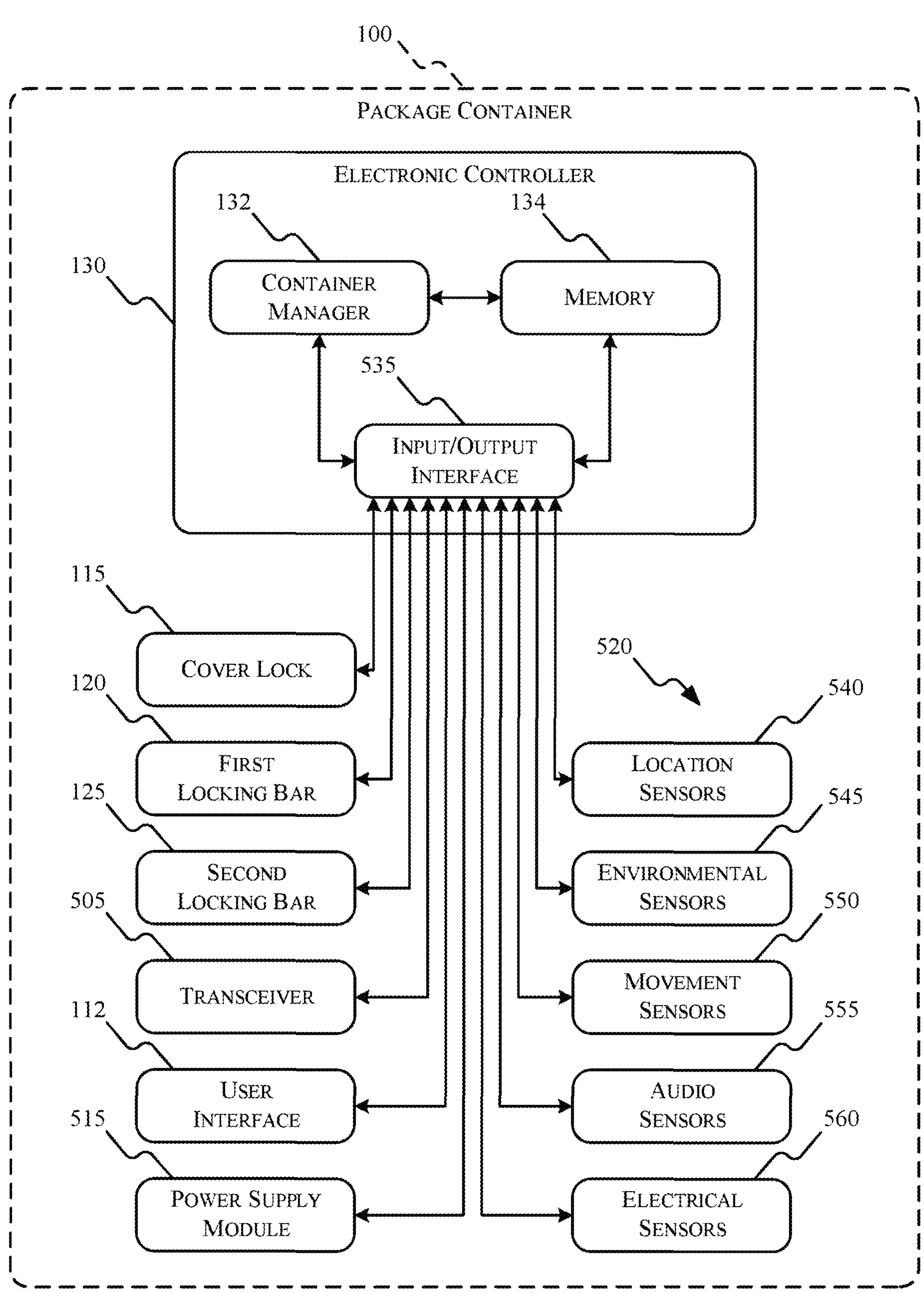
FIG. 5 is a diagram of a package container, in accordance with some embodiments.

FIG. 5 is a diagram of one exemplary embodiment of the components included in the package container 100. In the embodiment illustrated, the package container 100 includes the cover lock 115, the first locking bar 120, the second locking bar 125, the electronic controller 130, a transceiver 505, the user interface 112, a power supply module 515, and a plurality of sensors 520.

The electronic controller 130 includes, among other things, the container manager 132 (e.g., an electronic processor, such as a microprocessor), the memory 134, an input/output interface 535, and a bus. The bus connects various components of the electronic controller 130 including the memory 134 to the container manager 132. The memory 134 includes read only memory (ROM), random access memory (RAM), an electrically erasable programmable read-only memory (EEPROM), other non-transitory computer-readable media, or any combination thereof. The container manager 132 is configured to retrieve program instructions and data from the memory 134 and execute, among other things, instructions to perform the methods described herein. Additionally or alternatively, the memory 134 is included in the container manager 132. The input/output interface 535 includes routines for transferring information between components within the electronic controller 130 and other components of internal and external to the package container 100.

The transceiver 505 is configured to provide communications between the package container 100 and the user device 250, the delivery management server 252, or a combination thereof. The transceiver 505 transmits signals to one or more communication networks and receives signals from the communication networks. In some embodiments, signals include, for example, data, data packets, or any combination thereof. In some embodiments, the transceiver 505 includes separate transmitters and receivers. The communication network may be implemented using various networks, for example, a cellular network, the Internet, a Bluetooth™ network, a wireless local area network (for example, Wi-Fi), a wireless accessory Personal Area Networks (PAN), cable, an Ethernet network, satellite, a machine-to-machine (M2M) autonomous network, and a public switched telephone network.

The user interface 112 can include any combination of digital and analog input or output devices required to achieve a desired level of control for the package container 100. For example, the user interface 112 can include a display, a camera, a speaker, a microphone, a fingerprint sensor, a plurality of knobs, dials, switches, buttons, and the like. To illustrate, the speaker can be used to generate audible output (e.g., speech, tone, or both). The microphone can be used to receive audible input (e.g., speech). In some embodiments, the user interface 112 includes a touch-sensitive interface (for example, touch-screen display) that displays visual output generated by software applications executed by the container manager 132. Visual output includes, for example, graphical indicators, lights, colors, text, images, graphical user interfaces (GUIs), combinations of the foregoing, and the like. The touch-sensitive interface includes a suitable display mechanism for displaying the visual output (for example, a light-emitting diode (LED) screen, a liquid crystal display (LCD) screen, and the like). The touch-sensitive interface also receives user input using detected physical contact (for example, detected capacitance or resistance). Based on the user input, the touch-sensitive interface outputs signals to the container manager 132 which indicate positions on the touch-sensitive interface currently being selected by physical contact. In some implementations, the user interface 112 includes a wireless device, a mobile device, or both. In some implementations, the user interface 112 is included in (e.g., physically attached to) the package container 100. In other implementations, the user interface 112 is remote from (e.g., not physically attached to) the package container 100. In a particular aspect, the user interface 112 includes the user device 250. In a particular example, the user device 250 corresponds to an extension of the user interface 112. The user interface 112 is coupled to the package container 100. As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. As used herein, "directly coupled" may include two devices that are coupled (e.g., communicatively coupled, electrically coupled, or physically coupled) without intervening components.

The power supply module 515 supplies a nominal AC or DC voltage to the package container 100. In some embodiments, the power supply module 515 is powered by one or more batteries or battery packs including in the package container 100. The power supply module 515 is also configured to supply lower voltages to operate circuits and components within the package container 100. In some embodiments, the power supply module 515 is powered by household power having nominal line voltages between, for example, 100 volts AC and 240 volts AC and frequencies of approximately 50 hertz to 60 hertz. In some embodiments, the power supply module 515 is powered by inductive charging, solar charging, or both.

The plurality of sensors 520 includes various sensors configured to detect various conditions of the package container 100. In some embodiments, the plurality of sensors 520 includes location sensors 540, environmental sensors 545, movement sensors 550, audio sensors 555, electrical sensors 560, or any combination thereof.

Location sensors 540 (for example, global positioning system (GPS) sensors) are used to determine an absolute or relative location of the package container 100. As explained above, in some examples, the package container 100 is secured to an anchoring point upon being delivered. In some embodiments, the electronic controller 130 ensures that the package container 100 has been delivered to the correct anchoring point by comparing the current location of the package container 100 (determined using the location sensors 540) to a location of a target anchor point. In some embodiments, the location sensors 540 determine the location of the package container 100 periodically. Alternatively and in addition, the location sensors 540 determine the location of the package container 100 in response to receiving a request (for example, via the transceiver 505). For example, the recipient or sender of the package container 100 sends a request signal to the electronic controller 130, via the transceiver 505, requesting a location of the package container 100. In response, the electronic controller 130 determines a current (or last known) location of the package container 100, via the location sensors 540, and transmits the location to the recipient or sender, via the transceiver 505. In some embodiments, the electronic controller 130 determines the location of the package container 100 based at least in part on one or more location signals received via the transceiver 505.

Environmental sensors 545 (for example, temperature sensors, humidity sensors, chemical sensors, and biological sensors) are used to determine the environmental conditions of the package container 100. For example, the environmental sensors 545 may be placed within the cavity 165 of the package container 100 and configured to determine the temperature and humidity. In some embodiments, the electronic controller 130 determines whether predetermined environmental conditions exist within the package container. For example, when the package container 100 is transported an item that requires a temperature below a set threshold, the electronic controller 130 continuously determines the temperature within the package container 100, via the environmental sensors 545, and transmits an alert signal when the temperature rises above the set threshold. In some examples, the environmental sensors 545 detect conditions external to the package container 100. For example, the electronic controller 130 tracks temperatures external to the package container 100, via the environmental sensors 545, and transmits the external temperatures. The external temperatures can indicate thermal challenges in maintaining a temperature within the package container 100 within the set threshold due to external conditions (e.g., too high external temperature or too low external temperature).

Movement sensors 550 (for example, an accelerometer, gyroscope, or a magnetometer) are used to detect movement of the package container 100. The ability to detect movement of the package container 100 provides a plurality of benefits. For example, while a normal level of movement is to be expected while the package container 100 is being transported, an excessive amount of movement (for example, movement caused by the package container 100 being dropped) may indicate mishandling. In some embodiments, the electronic controller 130 uses the movement sensors 550 to detect when the amount of movement is above a set threshold and transmits an alert signal to, for example, the sender, the buyer, the intended recipient, the shipping company, or any combination thereof. These alerts signal may be used to determine the cause of damaged packages.

Another benefit of movement sensors 550 is added security. For example, after being secured to an anchoring point the package container 100 should not be moving until the recipient retrieves the packages. Movement of the package container 100 after being secured to an anchor point and prior to being retrieved by the recipient could indicate a potential theft attempt. Thus, in some embodiments, the electronic controller 130 detects such improper movement of the package container 100 and transmits an alert signal to, for example, the sender, the buyer, the intended recipient, the shipping company, or any combination thereof.

Audio sensors 555 (for example, a microphone) are used to record noise present around the package container 100. For example, the audio sensors 555 can record audio during a potential theft of the package container 100 while it is secured to an anchor point. The recorded audio can later be used to determine the identity of the party attempting to steal the package container 100. In a particular aspect, the user interface 112 includes one or more of the audio sensors 555.

The electrical sensors 560 are used to detect movement of the cover 110 between an opened state and a closed state. For example, the container manager 132 can determine that a trial has started in response to detecting, based on input from the electrical sensors 560, that the cover 110 has moved from the closed state to the opened state for the first time subsequent to arrival at a delivery location. Electrical sensors 560 are provided as an illustrative example of sensors that can be used to detect movement of the cover 110. In other implementations, various types of sensors can be used to detect movement of the cover 110, such as a magnetic sensor (e.g., a hall effect sensor, a reed relay sensor, or both), an electrical contact sensor, a camera, or another type of sensor.

Figure 6:
FIG. 6 is a flowchart of a method of using the package container of FIG. 1 to return an item, in accordance with some embodiments.
Figure 6:
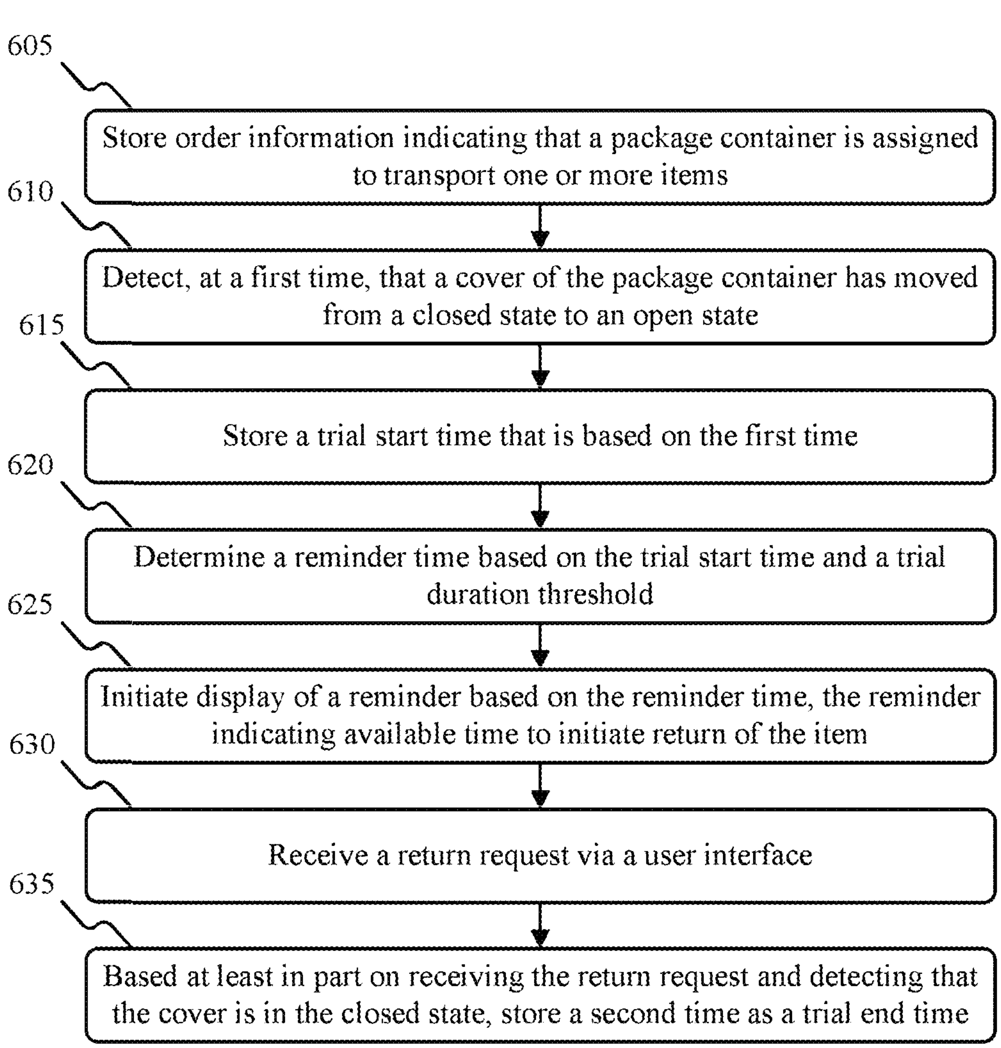

FIG. 6 illustrates an exemplary method 600 of returning the package container 100. In the example illustrated, the method 600 includes the memory 134 of the package container 100 storing the order information 201 (at block 605). At block 610, the container manager 132 detects, at a first time, that the cover 110 of the package container 100 has moved from a closed state to an open state. For example, the cover 110 is adjusted from the closed position to the open position for a recipient to retrieve the item 170 from the cavity 165 of the package container 100.

At block 615, the container manager 132 stores a trial start time in the memory 134 of the package container 100. The trial start time is based on the first time. In a particular example, a trial of the item 170 starts at the trial start time.

At block 620, the container manager 132 determines a reminder time (e.g., 11:30 AM) based on the trial start time (e.g., 10:00 AM) and a trial duration threshold (e.g., reminder time=trial start time+0.75*trial duration threshold). For example, the trial duration threshold indicates a return window (e.g., 2 hours) during which a return can be initiated for a refund. The reminder time is subsequent to the trial start time and prior to expiration of the return window.

At block 625, the container manager 132 initiates display of a reminder based on the reminder time. For example, the container manager 132 sends a reminder to the user device 250 at the reminder time for display, sends a request to the user device 250 to display the reminder at the reminder time, provides the reminder at the reminder time to the user interface 112 for display, or a combination thereof.

At block 630, the container manager 132 receives the return request 222 via the user interface 112. For example, a recipient activates the user interface 112 (e.g., a button) to request a return of the item 170. At block 635, the container manager 132, based at least in part on the return request 222 and detecting that the cover 110 is in a closed state, stores a second time as a trial end time in the memory 134.

The package container 100 includes a unique identifier (for example, a unique code) that is used to distinguish the package container 100 from a different package container. In some embodiments, the unique identifier for the package container 100 is electronically readable. For example, the unique identifier is stored in the memory 134 of the electronic controller 130. As a further example, the unique identifier is stored in an electronically readable tag included in the package container 100 such as a radio frequency identification (RFID) tag or a near-field communication (NFC) tag. Alternatively or in addition, the unique identifier is optically readable on the package container 100. For example, the unique identifier is a barcode (or QR code) image attached to an outer surface of the body 105 or displayed by a touch-screen display included in the user interface 112.

The unique identifier eliminates the need to place a new physical label on the package container 100 for each subsequent delivery of the package container 100. Rather, the input for each delivery (for example, destination information, pick-up information, etc.) is associated with the unique identifier of the package container 100.

In a particular aspect, a package container includes a body, a cover, a cover lock, a user interface, and an electronic controller. The body has a base, an opening, and at least one side wall that define a cavity therebetween. The cover is coupled to the body. The cover is movable from a closed state covering the opening to an open state. The cover lock is configured to, when activated, keep the cover in the closed state. The electronic controller is coupled to the user interface and the cover lock. The electronic controller includes a memory and a processor. The processor is configured to store order information in the memory. The order information indicates that the package container is assigned to transport one or more items in the cavity. The processor is also configured to detect, at a first time, that the cover has moved from the closed state to the open state. The processor is further configured to store a trial start time that is based on the first time. The processor is also configured to receive a return request via the user interface. The processor is further configured to, based at least in part on receiving the return request and detecting that the cover is in the closed state, store a second time as a trial end time, and send a transportation request to a delivery management server to initiate transportation of the package container.

In another particular aspect, a method includes storing, in a memory of a package container, order information indicating that the package container is assigned to transport one or more items. The method also includes detecting, at a first time at an electronic controller of the package container, that a cover of the package container has moved from a closed state to an open state. The method further includes storing a trial start time that is based on the first time. The method also includes determining a reminder time based on the trial start time and a trial duration threshold. The method further includes initiating display of a reminder based on the reminder time. The reminder indicates available time to initiate return of the one or more items. The method also includes receiving, at the electronic controller, a return request via a user interface. The method further includes, based at least in part on receiving the return request and detecting that the cover is in the closed state, storing a second time as a trial end time.

In another particular aspect, a method includes receiving, at a user device, a trial start notification from at least one of a package container or a delivery management server. The trial start notification indicates initiation of a trial of one or more items. The one or more items are assigned for transportation to the package container. The method also includes providing the trial start notification to a display. The method further includes receiving, at the user device, a return request notification from the package container. The method also includes, in response to receiving the return request notification from the package container, sending the return request notification from the user device to a delivery management server. The method further includes receiving, at the user device from the delivery management server, return information responsive to the return request notification. The method also includes providing the return information to the display. The method further includes receiving, at the user device, a trial end time of the trial from the package container. The method also includes sending the trial end time to the delivery management server to initiate transportation of the package container. The method further includes receiving, at the user device, a trial end notification from at least one of the package container or the delivery management server. The trial end notification indicates that the trial has ended. The method also includes providing the trial end notification to the display.

In another particular aspect, a method includes receiving, at a delivery management server from at least one of a user device or a package container, an opened notification indicating that a cover of the package container has moved from a closed state to an open state. One or more items are assigned for transportation to the package container. The method also includes storing a trial start time in response to receiving the opened notification. The method further includes receiving a return request notification at the delivery management server from at least one of the user device or the package container. The method also includes, subsequent to receiving the return request notification, receiving a closed notification at the delivery management server from at least one of the user device or the package container. The method further includes, based on receiving the return request notification and the closed notification, storing a trial end time and initiating transportation of the package container.

This disclosure is not limited in its application to the examples provided, the embodiments discussed, or to the details of construction and the arrangement of components set forth in the foregoing description or drawings. The disclosure is capable of other embodiments and of being practiced or of being carried out in various ways.

What is claimed is:

1. A delivery management server comprising:

one or more processors configured to:

receive a return request notification indicating that a return is requested using a package container;

based at least in part on receipt of the return request notification and a determination that a cover of the package container is in a closed state, store a trial end time;

receive a return notification indicating arrival of the package container at a merchant location;

in response to receiving the return notification, retrieve a package trial end time from the package container; and generate an alert in response to determining that a difference between the trial end time and the package trial end time exceeds a trial end time threshold; and send, to the package container, a lock command to activate a cover lock to keep the cover in the closed state, wherein the lock command is sent based at least in part on receipt of the return request notification and the determination that the cover of the package container is in the closed state.

2. The delivery management server of claim 1, wherein the one or more processors are configured to, based at least in part on receipt of the return request notification and the determination that the cover of the package container is in the closed state:

determine a trial duration based on a comparison of a trial start time and the trial end time; and based on a determination that the trial duration is less than or equal to a trial duration threshold, send a request to direct a transportation vehicle to a container location to retrieve the package container.

3. The delivery management server of claim 2, wherein the trial duration threshold is based on a return window and a tolerance threshold.

4. The delivery management server of claim 1, wherein the one or more processors are configured to;

determine a reminder time based on a trial start time and a trial duration threshold; and initiate display of a reminder based on the reminder time, the reminder indicating an available time to initiate return of one or more items transported in the package container.

5. The delivery management server of claim 1, wherein the return request notification indicates that a second item is to be returned in the package container, wherein the second item is distinct from one or more items delivered to a delivery location in the package container, and wherein the trial end time is associated with the second item.

6. The delivery management server of claim 1, wherein the one or more processors are configured to:

receive a closed notification from the package container, wherein the determination that the cover of the package container is in the closed state is based on receiving the closed notification; and in response to receipt of the closed notification subsequent to the receipt of the return request notification, send a trial end notification to a user device.

7. The delivery management server of claim 1, wherein the one or more processors are configured to:

determine that a cover lock of the package container is activated; and determine the trial end time based on at least one of a request time at which the return request notification is received, a closed time at which the cover is determined to be in the closed state, or a lock time at which the cover lock is activated.

8. The delivery management server of claim 1, wherein the one or more processors are configured to:

in response to the receipt of the return request notification, send a return information request to a user device;

receive return item information from the user device; and store the return item information.

9. A method comprising:

receiving, at a delivery management server, a return request notification indicating that a return is requested using a package container;

based at least in part on receiving the return request notification and determining that a cover of the package container is in a closed state, storing a trial end time at the delivery management server;

receiving, at the delivery management server, a return notification indicating arrival of the package container at a merchant location;

in response to receiving the return notification, retrieving a package trial end time from the package container; and generating, at the delivery management server, an alert in response to determining that a difference between the trial end time and the package trial end time exceeds a trial end time threshold; and sending, to the package container, a lock command to activate a cover lock to keep the cover in the closed state, wherein the lock command is sent based at least in part on receipt of the return request notification and the determination that the cover of the package container is in the closed state.

10. The method of claim 9, further comprising, based at least in part on receiving the return request notification and determining that the cover of the package container is in the closed state:

determining a trial duration based on a comparison of a trial start time and the trial end time; and based on determining that the trial duration is less than or equal to a trial duration threshold, sending a request to direct a transportation vehicle to a container location to retrieve the package container.

11. The method of claim 10, wherein the trial duration threshold is based on a return window and a tolerance threshold.

12. The method of claim 9, further comprising:

determining a reminder time based on a trial start time and a trial duration threshold; and initiating display of a reminder based on the reminder time, the reminder indicating an available time to initiate return of one or more items transported in the package container.

13. The method of claim 9, further comprising:

determining, at the delivery management server, that a cover lock of the package container is activated; and determining, at the delivery management server, the trial end time based on at least one of a request time at which the return request notification is received, a closed time at which the cover is determined to be in the closed state, or a lock time at which the cover lock is activated.

14. The method of claim 9, further comprising:

in response to the receiving of the return request notification, sending a return information request from the delivery management server to a user device;

receiving return item information at the delivery management server from the user device; and storing the return item information at the delivery management server.

15. The method of claim 9, further comprising:

determining, at the delivery management server, that the cover of the package container is in the closed state based on receiving a closed notification from the package container; and in response to receiving the closed notification subsequent to receiving the return request notification:

sending a trial end notification from the delivery management server to a user device; and sending, from the delivery management server to the package container, a lock command to activate a cover lock to keep the cover in the closed state.

16. A non-transitory computer-readable medium storing instructions that, when executed by one or more processors, cause the one or more processors to:

receive a return request notification indicating that a return is requested using a package container;

based at least in part on receipt of the return request notification and a determination that a cover of the package container is in a closed state, store a trial end time;

receive a return notification indicating arrival of the package container at a merchant location;

in response to receiving the return notification, retrieve a package trial end time from the package container; and generate an alert in response to determining that a difference between the trial end time and the package trial end time exceeds a trial end time threshold; and send, to the package container, a lock command to activate a cover lock to keep the cover in the closed state, wherein the lock command is sent based at least in part on receipt of the return request notification and the determination that the cover of the package container is in the closed state.

17. The non-transitory computer-readable medium of claim 16, wherein the instructions, when executed by the one or more processors, cause the one or more processors to, based at least in part on receipt of the return request notification and the determination that the cover of the package container is in the closed state:

determine a trial duration based on a comparison of a trial start time and the trial end time; and based on a determination that the trial duration is less than or equal to a trial duration threshold, send a request to direct a transportation vehicle to a container location to retrieve the package container.

18. The non-transitory computer-readable medium of claim 16, wherein the instructions, when executed by the one or more processors, cause the one or more processors to:

determine a reminder time based on a trial start time and a trial duration threshold; and initiate display of a reminder based on the reminder time, the reminder indicating an available time to initiate return of one or more items transported in the package container.

19. The non-transitory computer-readable medium of claim 16, wherein the instructions, when executed by the one or more processors, cause the one or more processors to, in response to the receipt of the return request notification, send return information to a user device.

20. The non-transitory computer-readable medium of claim 16, wherein the instructions, when executed by the one or more processors, further cause the one or more processors to:

in response to the receipt of the return request notification, send a return information request to a user device;

receive return item information from the user device; and store the return item information.

* * * * *